Patented Nov. 16, 1948

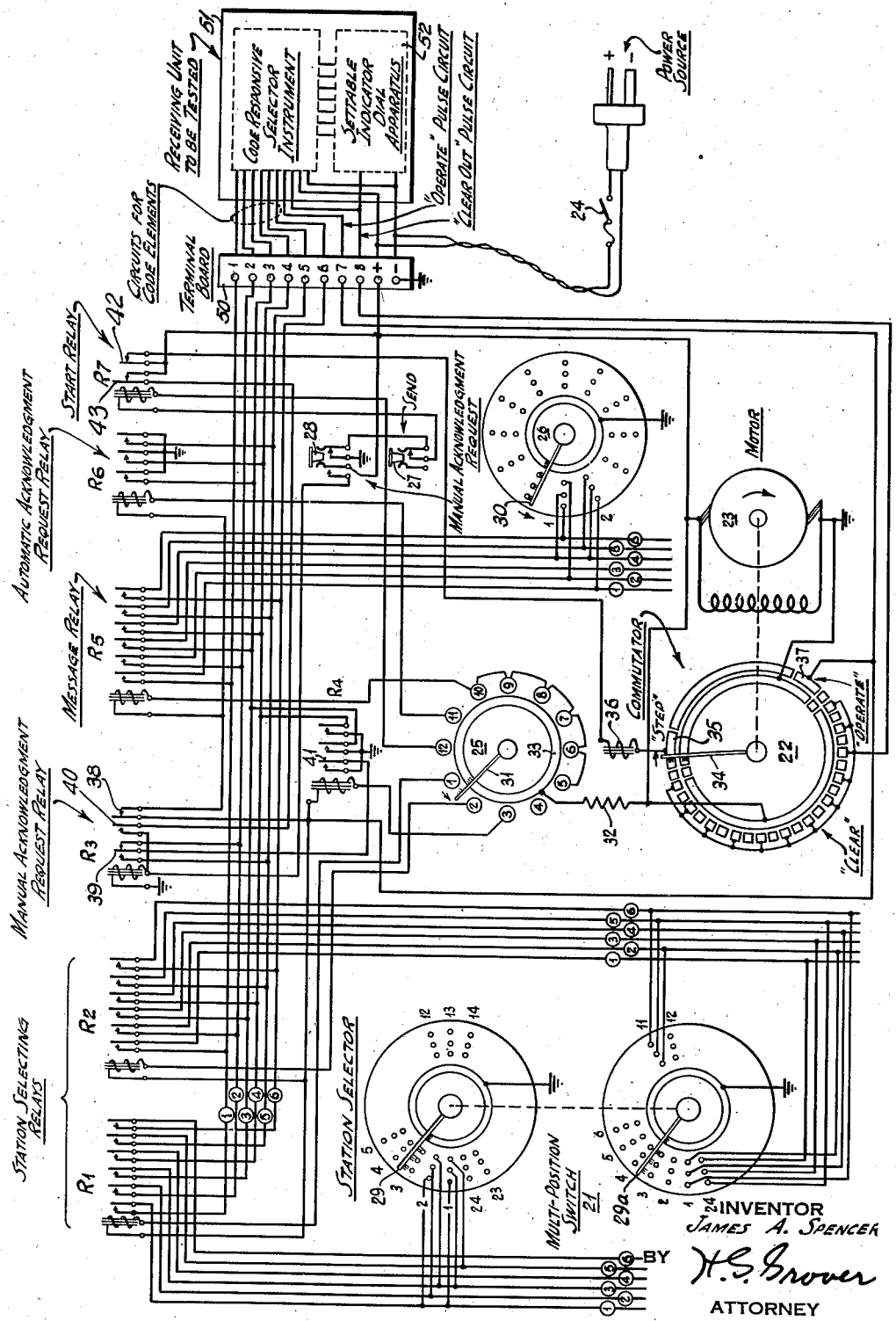

2,453,871

UNITED STATES PATENT OFFICE 2,453,871

VARIABLE TEST TRANSMITTER

James A. Spencer, Teaneck, N. J., assignor to Radio Corporation of America, a corporation of Delaware Application June 29, 1945, Serial No. 602,233

8 Claims. (Cl. 177—380)

1

This invention relates to control circuit arrangements and has particular reference to a device for testing a code-responsive selector instrument such as may be used, for example, to control remotely located indicators and the like.

In certain types of apparatus selecting means are provided subject to remote control over radio channels. In practice a number of separate units of equipment are employed, each in a different location. A signal transmitter is equipped with the necessary keying devices for sending code signals suitable for actuating the selecting means at any desired station and thereafter for controlling the setup of dial indications thereby to convey intelligence and to store such intelligence in the operated indicator dials. The signaling procedure is to transmit two code signals which have a station selecting significance. Then a clearance signal is usually transmitted, its purpose being to restore the indicator dials to a home position at which they display blank areas. In place of the clearance signal a "request for acknowledgment" signal may be sent immediately following the transmission of station selecting signals. The request for acknowledgment signal is automatically responded to by the transmission of a signal from the "called" station back to the signal transmitter. Such a signal will indicate to the operator at the transmitter that the previous signals have been responded to at the selected station.

The device of the instant invention is intended to be used merely for test purposes. It is also confined to the testing of the progressive code selectors and indicator units forming part of a complete translating system. The testing of radio apparatus which would be used in practical applications of the complete system is not contemplated or covered in the instant application.

It is, however, a principal object of my invention to provide electrical circuit equipment including manually operable switches and a motor driven distributor in combination with certain relays and a magnetically operable stepping switch whereby code combinations representing different signals may be set up and transmitted by wire conductors in place of radio channels directly to the selecting mechanism which forms part of the standard teleselector unit and associated indicators, hereinafter called a receiving unit.

Other objects of my invention will become apparent in the description to follow. This description is accompanied by a drawing the sole

2 figure of which represents more or less diagrammatically a circuit arrangement with associated switches and relays to be conductively connected to the operating magnets of a teleselector for test purposes.

Referring to the drawing, I show therein a terminal board 50 for the testing apparatus proper. The apparatus unit 51 to be tested has corresponding terminals which may be connected thereto for causing code signals to be applied which would control a progressive code selector in this apparatus and also cause indications to be made assuming that the apparatus to be tested also includes settable indicator dials 52 or the equivalent.

For the purpose of setting up, or composing two signals having a station selecting function, I provide a manually operable station selector switch 21 consisting preferably of two wafers or discs upon each of which are mounted three rows of contacts and a collector ring. The contacts are electrically insulated from one another. The two collector rings are both grounded. The discs are so positioned that wipers simultaneously connect three contacts on each disc to ground.

The three contacts on each disc in any position represent a combination of code elements such as would be transmitted under operating conditions for the purpose of selecting a station to be responded to by subsequent code signals for indicator control purposes. The two wafers of the station selector switch 21 meet the requirements for transmitting two code signals each having three permutationally arranged marking code elements which in practice would be transmitted sequentially and interspersed with spacing code elements of a six unit code signal. For test purposes, however, the positions of the marking code elements in any group of six code units are denoted by the simultaneous application of signal energy to three separately selected conductors leading to the terminal board 50. The transmission of successive complete code signals is provided for, in practicing my invention, by the use of a rotary distributor 22 in cooperation with a stepping switch 25. The power for driving this switch continuously is obtained from a motor 23. This motor, however, may be started and stopped by means of a manual switch 24 in its power supply line. The rotary distributor 22 is provided with a segmented ring having numerous small segments, and a collector ring having segments which extend through different arcs and which have independent connections for bridging different segments at different times to the required control points of the circuit, all as will be hereinafter explained in more detail.

Since the equipment to be tested is conventionally provided with a number of indicator dials, it is necessary to transmit a succession of code signals whereby the indicator dials can be individually set to display selected indicia. For this purpose a magnetically operable step-by-step selector switch 25 is provided. This switch has twelve positions and its brush makes different connections as it progresses through its twelve positions, resting on the contact of each position during a complete cycle of the brushes on the motor driven distributor 22.

Now in order to test the operability of the selecting mechanism and the indicators for response to indicator setting signals, I provide a manually operable selector switch 26 having twelve positions. In each position the rotary brush arm 30 makes contact with three individually insulated contact points and grounds the same through a collector ring. Each of the twelve positions of the switch 26 provides a selected code combination of three marking elements to be interspersed with three spacing elements of the indicator-setting code signals.

Two manually operable push buttons 27 and 28 are provided. Button 27 is used for initiating the transmission of code signals. Button 28 is used for sending a signal which signifies a request for acknowledgment.

The control equipment including both manually operable rotary switches and the motor driven distributor 22 serves to compose the necessary signals for transmission to the selecting and indicating equipment for test purposes. The timing of the signals and the sequential transmission thereof is, however, accomplished under joint control of the distributor 22 and stepping switch 25 and by the actuation of different relays R1, R2, R3, R4, R5, R6 and R7 respectively. The windings of these relays are connected to different points on the rotary switches or on the push buttons 27 and 28 in a suitable manner for simulating the transmission of signals by radio under practical operating condtions.

*Operating procedure*

After connecting a receiving unit 51 to the terminals of the terminal board 50, and knowing the two code combinations which are applicable to a particular receiver unit, the brushes 29 and 29a on the station selector switch 21 may be manually set to the particular position which provides a selection of the different marking code elements in each of the station's two selector signals which are to be successively transmitted. If, for example, the station selector switch is set to position 1, then the first signal for station selection will be composed of three marking elements in positions 1, 3 and 5. The marking elements of the second code signal as selected by the position 1 of the brush 29a will provide marking elements in the 2d, 4th and 6th positions of the code signal.

Next the brush arm 30 on the manually operable selector switch 26 will be set to position 1 where a message code signal will be selected for impressing marking potential on the 2d, 4th and 6th code signal conductors representing individual code units. Other positions of the selector switch 26 will be taken up by the brush 30 as the testing operation proceeds. In each position a different message code signal will be formulated. The purpose of the message code signal is to produce a response in the receiving unit 51 such as to set one of the dails of the indicator apparatus 52 to a predetermined position.

The "send" button 27 is now operated. This button opens a relay circuit through the winding of relay R7, removing ground from one of the terminals of the actuating coil on this relay. The brush 31 on the step-by-step switch 25 is presumed to be located on contact 12 at this time. Accordingly, it will be understood that relay R7 was normally energized from the moment that the power switch 24 was closed to feed current through a resistor 32 to the collector ring 33 on the step-by-step switch 25.

As the brush 34 on the commutator 22 rotates it traverses a segment 35 which establishes a ground connection to one terminal of a stepping magnet 36 for the step-by-step switch 25. The other terminal of this magnet is connected to the positive terminal of the power line through contacts 42 of relay R7 whenever this relay is de-energized. Such de-energization may be accomplished by either of the two push buttons 27 or 28, and also by advancing the brush 31 of the stepping switch 25 away from its segment 12.

From the above it will be seen that after depressing the send button 27 the next grounding of the segment 35 on the commutator will cause the step-by-step switch 25 to advance its brush from position 12 to position 1. Relay R7 in consequence will then remain de-energized and relay R1 will operate by virtue of the circuit established through segment 1 of the step-by-step switch 25. This relay operation, however, is timed in accordance with the passage of a brush 34 (commutator 22) onto segment 37, which is called an "operate" segment.

Simultaneously with the operation of relay R1 positive potential is applied to terminal 7 on the terminal board 50 to which the tested receiving unit 51 is connected. The purpose of the circuit through terminal 7 is to provide a clutch-engaging impulse whereby the selector unit is caused to be driven by its motor for purposes of responding to a code signal. The code signal as composed by the setting of the brush 29 on station selector switch 21 is fed through contacts of relay R1 to selected ones of the terminals 1 to 6 inclusive of the terminal board 50. The first code signal for station selecting is thus transmitted to the receiving unit to be tested.

When the brush 34 on the commutator 22 again rotates to segment 35 a second impulse will be applied to the stepping magnet 36, relay R7 being understood to remain in its de-energized condition, so that the brush 31 will be advanced to position 2 on switch 25. Immediately following this operation brush 34 on commutator 22 will apply an impulse through segment 37 to relay R2 for the purpose of transmitting the second code signal to be used in station selecting. The ground potential for transmitting this code signal is obtained at the collector ring on switch 21 and composes a signal for transmission on conductors 2, 4 and 6 through contacts of relay R2 and thence to the same selected terminals 2, 4 and 6 of the terminal board 50.

Upon revolving the brush arm 34 of the commutator 22 to segment 35 for the third time, the step-by-step switch 25 will be once more actuated to move its brush 31 into position 3. Here a circuit is established through the winding of relay R4 as soon as the brush 34 reaches segment 37 on the commutator 22. Relay R4 has three pairs of contacts, one contact in each pair being grounded and the other three contacts being connected respectively to conductors 2, 3 and 4 leading to the correspondingly numbered terminals of the terminal board. The code signal thus composed is responded to by the receiving unit by way of setting in operation a clearance cycle whereby the indicator units are all caused to be driven home in a step-by-step manner and in response to the transmission of a pulsating current originated at the commutator 22. The clearing operation is further described as follows:

Terminal 8 on the terminal board is connected to twelve small segments of the commutator 22 which occupy an arc in between segment 37 and segment 35. While relay R4 is energized, therefore, a train of impulses is transmitted to the receiving unit for restoring the indicator dials to a home position. It will be noted that the twelve commutator impulses are delivered to terminal 8 during each revolution of the brush arm 34 of the commutator 22 regardless of the position of brush arm 31 of step-by-step switch 25. However, these impulses will have no effect on the operation of the equipment under test unless relay R4 is energized setting up the above described code signal. It is necessary, prior to the transmission of a message indicative signal, that the relay R4 be actuated and the clearance code step be received, since, in the chosen embodiment, the indicator dials of the equipment under test operate step-by-step and remain in their last actuated position. Thus, were dial operating signals received prior to their being returned to their home position, an erroneous indication would result.

The step-by-step switch 25 is now caused to move its brush 31 to position 4 which is blank and allows time for the receiving unit to be conditioned for response to a series of message code signals as selected by different positions of the selector switch 26. In each of the positions of this switch the setting of its brush 30 establishes a different code combination for signals to be transmitted through relay R5. This relay is, therefore, successively operated by connecting its winding through a circuit which on one side derives plus potential through any one of the contacts 5 to 10 inclusive on the step-by-step switch 25, and on the other side of the relay R5 connection is made through normally closed contacts 38 of relay R3 and thence to segment 37 of the commutator 22 opposite which is a grounded segment of the collector ring.

In accordance with a desired setting of the brush 30 on the selector switch 26 six different dials of the receiving unit may be successively actuated so as to set up the same indication. Different settings for all the indicator dials may be tested with each different position of the brush 30. Erroneous operation may readily be detected when the response to the message code signals fails to show uniformity in the different dial settings.

After the step-by-step switch 25 has been advanced to position 11 relay R6 becomes energized for the purpose of automatically transmitting another signal denoting request for acknowledgment. The signal composed by relay R6 is different from that which is composed by relay R3 and is used only after setting up the dials of the indicators on the receiving unit. This is the last step of operation for test purposes prior to the setting of switch 25 in its twelfth position, energizing relay R7 as described above. The energization of relay R7 opens contacts 42 and 43, thereby preventing the energization of the stepping magnet 36 upon continual rotation of brush 34 of commutator 22 and providing for the unlocking of relay R3. As referred to in the early part of this description of operation, relay R7 is deenergized for placing the test circuits in condition to be used in a further cycle of test operations either for the connected receiving unit or for a different receiving unit.

If after sending the station selecting signals through relays R1 and R2 it is desired to obtain an acknowledgment signal before transmitting message signals then the clear out signal composed by relay R4 is modified so as to substitute an acknowledgment request signal and also to disconnect the circuit for energizing relays R5 and R6.

The composition of the code signal for acknowledgment request when called for by the depression of key 28 is determined by the circuit traversing contact 39 of relay R3. The movable contact 39 is connected to movable contact 41 on relay R4. Relay R4 is actuated only when the step-by-step switch brush rests on segment 3 of switch 25. At this time, therefore, the substitution of a request for acknowledgment signal in place of the clearance signal may take place and is accomplished by depression of push button 28 for energizing relay R3. The movable contact 39 applies ground potential to conductor 5 of the code signal circuits. Conductors 3 and 4 are used both for the clearance signal and for the acknowledgment request signal. Conductor 2 for the code signals is open-circuited when relay R3 operates since its contact 39 moves away from a back contact connected with circuit 2. Thus the code signal for acknowledgment request impresses marking potential on conductors 3, 4 and 5, whereas for the clearance signal marking potential is impressed on conductors 2, 3 and 4.

From the moment relay R3 is energized by the closing of contacts on the push button 28 it becomes self-locking through its own pair of contacts 40 which are in circuit with breaker contacts on relay R7. Therefore, relay R3 can be unlocked only upon operation of relay R7 when the brush 31 of step-by-step switch 25 moves to position 12.

For a more complete understanding of the operations which are to be performed in controlling the receiving unit reference is here made to certain applications of Leonhard F. Reinhold and James A. Spencer, particularly Serial Number 542,926, filed June 30, 1944, now Patent No. 2,406,044, granted August 20, 1946, and Serial Number 574,288, filed January 24, 1945, now Patent No. 2,404,814, granted July 30, 1946. These pending applications show a preferred selecting mechanism which is adapted to respond to code signals. Serial Number 574,288 discloses selecting mechanism suitable for station selection.

A teleselector of the type shown in either of these applications possesses an orientable shaft which may carry a brush arm for actuating different circuits terminating at the segments of a rotary distributor. Such circuits may be employed for the purpose of setting the dials of any suitable and well known indicator device, as will be understood by those skilled in the art. My invention, however, does not extend to the details of the apparatus to be tested, but comprehends only the testing unit hereinabove described, and obvious modifications thereof.

I claim:

1. A control circuit arrangement comprising in combination a continuously rotating motor driven distributor for timing a plurality of circuit closures on different individual circuits, a magnetically actuated step-by-step switch the actuating coil of which is in circuit with a first segment on said distributor, a power source, a circuit-breaking relay the normally closed contacts of which connect one terminal of said source through said coil and through said distributor to the other terminal of said source, manually adjustable means for composing different code signals to be sequentially transmitted, relays for determining a desired sequence of transmission of such signals, and circuit connections for operating said relays under joint control of said distributor and said step-by-step switch.

2. A circuit arrangement according to claim 1 and including a second segment on said distributor, which segment is arranged and adapted to complete said relay operating circuit connections for different relays depending on the progression of said step-by-step switch.

3. A circuit arrangement according to claim 1 and including a series of segments on said step-by-step switch, which segments are constituted as selector terminals individual to said relay operating circuit connections.

4. A control circuit arrangement for testing the operation of a selector of the type which responds to code signals of uniform length, said circuit arrangement comprising in combination a multi-throw switch the electromagnetic actuation of which serves to effect sequential transmission of said signals, a group of relays each individually operable through a circuit which traverses one or more positions of said multi-throw switch, a motor driven distributor having a face-plate which comprehends a plurality of segments in two rings and a brush member for successively connecting the segments of one ring to appropriate segments of the other ring, two certain segments in the two rings serving when bridged to actuate said multi-throw switch in a step-by-step manner, and two other segments in the two rings serving when bridged to actuate a particular relay as determined by the position of said multi-throw switch, means for permutationally composing the elements of a series of code signals to be transmitted, and circuits closeable by each of said relays for effecting the transmission of said signals to the selector which is to be tested.

5. A control circuit arrangement according to claim 4 and including in one of the rings of said distributor a further series of segments and means including a common circuit connected thereto for transmitting to the device to be tested a series of signal pulses having an indicator dial homing control function.

6. A control circuit arrangement comprising in combination a continuously rotating motor driven dristributor for timing a plurality of circuit closures on different individual circuits, a magnetically actuated step-by-step switch, the actuating coil of which is in circuit with a first segment on said distributor, a power source, a circuit-breaking relay, the normally closed contacts of which connect one terminal of said source through said coil and through said distributor to the other terminal of said source, manually adjustable means for composing different code signals to be sequentially transmitted, relays for determining a desired sequence of transmission of such signals, circuit connections for operating said relays under joint control of said distributor and said step-by-step switch, and means including a push button and a self-locking relay controllable by said push button for altering the sequence of transmission of said selected signals during a cycle of said step-by-step switch.

7. A circuit arrangement according to claim 6 and including a second segment on said distributor, which segment is arranged and adapted to complete said relay operating circuit connections for different relays depending on the progression of said step-by-step switch.

8. A circuit arrangement according to claim 6 and including a series of segments on said step-by-step switch, which segments are constituted as selector terminals individual to said relay operating circuit connections.

JAMES A. SPENCER.

REFERENCES CITED

The following references are of record in the file of this patent:

UNITED STATES PATENTS

| Number | Name | Date |
|---|---|---|
| 1,864,074 | Krum | June 21, 1932 |
| 1,971,686 | Kinkead | Aug. 28, 1934 |
| 2,103,296 | Nelson | Dec. 28, 1937 |
| 2,139,079 | Haselton | Dec. 6, 1938 |
| 2,376,225 | Beyland | May 14, 1945 |